(12) United States Patent
Marten

(10) Patent No.: US 11,800,202 B2
(45) Date of Patent: Oct. 24, 2023

(54) SYSTEMS AND METHODS FOR GENERATING SUPPLEMENTAL CONTENT FOR A PROGRAM CONTENT STREAM

(71) Applicant: DISH Network L.L.C., Englewood, CO (US)

(72) Inventor: Neil Marten, Lakewood, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 16/566,630

(22) Filed: Sep. 10, 2019

(65) Prior Publication Data

US 2021/0076106 A1 Mar. 11, 2021

(51) Int. Cl.
*H04N 21/854* (2011.01)
*H04N 21/8545* (2011.01)
*G09B 7/08* (2006.01)
*G10L 15/18* (2013.01)
*G10L 15/26* (2006.01)
*H04N 21/6587* (2011.01)
(Continued)

(52) U.S. Cl.
CPC ........... *H04N 21/8545* (2013.01); *G09B 7/08* (2013.01); *G10L 15/1815* (2013.01); *G10L 15/26* (2013.01); *H04N 21/6587* (2013.01); *H04N 21/8126* (2013.01); *H04N 21/84* (2013.01)

(58) Field of Classification Search
None
See application file for complete search history.

(56) References Cited

U.S. PATENT DOCUMENTS 8,745,683 B1* 6/2014 Maeng ............... H04N 21/4722
725/110
9,471,203 B1* 10/2016 O'Dell, III .......... G06F 3/04886
(Continued)

FOREIGN PATENT DOCUMENTS

KR 10-2014-0092598 A 7/2014
WO 2018/105833 A1 6/2018

OTHER PUBLICATIONS

International Search Report and Written Opinion, for International Application No. PCT/US2020/049985, dated Oct. 20, 2020, 40 pages.
(Continued)

*Primary Examiner* — Jefferey F Harold
*Assistant Examiner* — Charles N Hicks
(74) *Attorney, Agent, or Firm* — Xuezhen Tian; VLP Law Group LLP

(57) ABSTRACT

Systems and methods for generating supplemental content for a program content stream include functionality that generates supplemental content such as educational questions. The questions may be generated based on the content of the program as learned by the system performing natural language processing (NLP) of the verbal content of the program content stream as the program is being presented on a television or mobile device. The system may pause the programming during presentation of the questions on the television or mobile device. The programming is then resumed once a correct answer is received or a timer runs out, whichever occurs first. The generated supplemental content may also be saved as metadata associated with the program for subsequent presentation when the program is played again for the viewer or other viewers.

22 Claims, 8 Drawing Sheets

(51) Int. Cl.
*H04N 21/81* (2011.01)
*H04N 21/84* (2011.01)

(56) References Cited

U.S. PATENT DOCUMENTS

| | | | |
|---|---|---|---|
| 10,046,242 B1 | 8/2018 | Abbas | |
| 2006/0107195 A1* | 5/2006 | Ramaswamy | H04N 21/443 |
| | | | 715/730 |
| 2007/0250901 A1* | 10/2007 | McIntire | G11B 27/34 |
| | | | 348/E7.071 |
| 2007/0265910 A1* | 11/2007 | Varghese | G06Q 30/0272 |
| | | | 705/14.69 |
| 2012/0209706 A1 | 8/2012 | Ramer et al. | |
| 2014/0308646 A1* | 10/2014 | Wurth | G09B 7/04 |
| | | | 434/350 |
| 2015/0100414 A1* | 4/2015 | Gupta | G06Q 30/0245 |
| | | | 705/14.44 |
| 2016/0173958 A1* | 6/2016 | Ryu | G10L 25/57 |
| | | | 704/235 |
| 2016/0357746 A1* | 12/2016 | Koul | G06F 16/9535 |
| 2017/0072302 A1* | 3/2017 | Abecassis | A63F 9/183 |
| 2017/0213469 A1* | 7/2017 | Elchik | G09B 7/02 |
| 2019/0191200 A1 | 6/2019 | Panchaksharaiah et al. | |
| 2019/0215579 A1 | 7/2019 | Beckett et al. | |
| 2019/0272770 A1 | 9/2019 | Kortan et al. | |
| 2019/0333402 A1 | 10/2019 | Kim et al. | |
| 2021/0042393 A1* | 2/2021 | Ishikawa | G06K 9/00456 |

OTHER PUBLICATIONS

Office Action received for European Patent Application No. 20775557.0, dated May 31, 2023, 9 pages.

* cited by examiner

SYSTEMS AND METHODS FOR GENERATING SUPPLEMENTAL CONTENT FOR A PROGRAM CONTENT STREAM

TECHNICAL FIELD

The technical field relates to delivering multimedia content, and particularly to generating supplemental content for a program content stream.

BRIEF SUMMARY

Supplemental content such as educational questions may be generated based on the content of the program as learned by the system via processing the verbal content of the program content stream (e.g., using natural language processing) as the program is being presented on a television or mobile device. The system may pause the original programming (or the playback of recorded programming) during presentation of the questions on the television or mobile device. The system then resumes the programming once a correct answer is received or a timer runs out, whichever occurs first. In this manner, any program with verbal content (spoken or written) may be processed as it is being received in real time or near real time and morphed into a more educational experience for the viewer. This eliminates the need for the program distributor or content creator to manually generate custom content to supplement the program before being broadcast and also enables the supplemental content to be customized according to the preferences and corresponding settings of the individual user. The generated supplemental content may also be saved as metadata associated with the program for subsequent presentation when the program is played again for the viewer or other viewers, thus further increasing efficiency of generating further supplemental content.

A method for for generating supplemental content for a program content stream, may be summarized as comprising: receiving, by a computerized system for generating supplemental content, the program content stream; processing, by the computerized system for generating supplemental content, verbal content of the program content stream as the program content stream is being received; generating, by the computerized system for generating supplemental content, supplemental content for the program content stream as the program content stream is being received based on the processing of the verbal content of the program content stream; and causing, by the computerized system for generating supplemental content, the supplemental content to be presented as the program content stream is being output for presentation on a presentation device.

A system for generating supplemental content for a program content stream may be summarized as comprising: at least one computer processor; and at least one memory coupled to the at least one computer processor. The at least one memory has computer-executable instructions stored thereon that, when executed by the at least one computer processor, cause the at least one computer processor to: generate questions, while a program content stream is being output for presentation on a presentation device, having answers that are one or more of extracted concepts communicated by verbal content of the program content stream; cause the questions to be presented on the presentation device or a mobile device of a user at different times while the presentation of the program content stream is paused; and store the generated questions, as metadata associated with a program of the program content stream, for presentation as supplemental content of the program during subsequent playback of the program.

Another method for generating supplemental content for a program content stream, may be summarized as comprising: performing natural language processing of content of a program content stream as the as the program content stream is being output for presentation on a presentation device; extracting concepts communicated by verbal content of the program content stream based on the performing of the natural language processing of the verbal content; and causing questions based on the extracted concepts to be presented on the presentation device or a mobile device of a user at different times while the presentation of the program content stream is paused.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

Multimedia content is becoming increasingly available through various different media sources. However, most of the media content is not interactive and lacks educational value, especially to children. A technical problem is thus presented in how to make the abundance of popular existing media content that often is received as a program content stream on one's receiving device (such as a cable or satellite set-top box, streaming media device, tablet or smartphone) more educational and interactive in a faster and more efficient manner as such content is being received by the receiving device.

The present disclosure provides a solution to the technical problem above by, in some embodiments, performing natural language processing (NLP) of the verbal content of the program content stream as the program content stream is being received to generate supplemental content for the program content. For example, this supplemental content may be or include educational questions that are based on the content of the program as learned by the system via performance of the NLP of the verbal content of the program content stream. The system may then pause the original programming (or the playback of recorded programming) to present the questions and then resume the programming once a correct answer is received or a timer runs out, whichever occurs first. In this manner, any program with verbal content (spoken or written) may be processed as it is being received in real time or near real time and morphed into a more educational experience for the viewer. This eliminates the need for the program distributor or content creator to manually generate custom content to supplement the program before being broadcast and also enables the supplemental content to be customized according to the preferences and corresponding settings of the individual user. The generated supplemental content may also be saved as metadata associated with the program for subsequent presentation when the program is played again for the viewer or other viewers, thus further increasing efficiency of generating further supplemental content.

Figure 1:
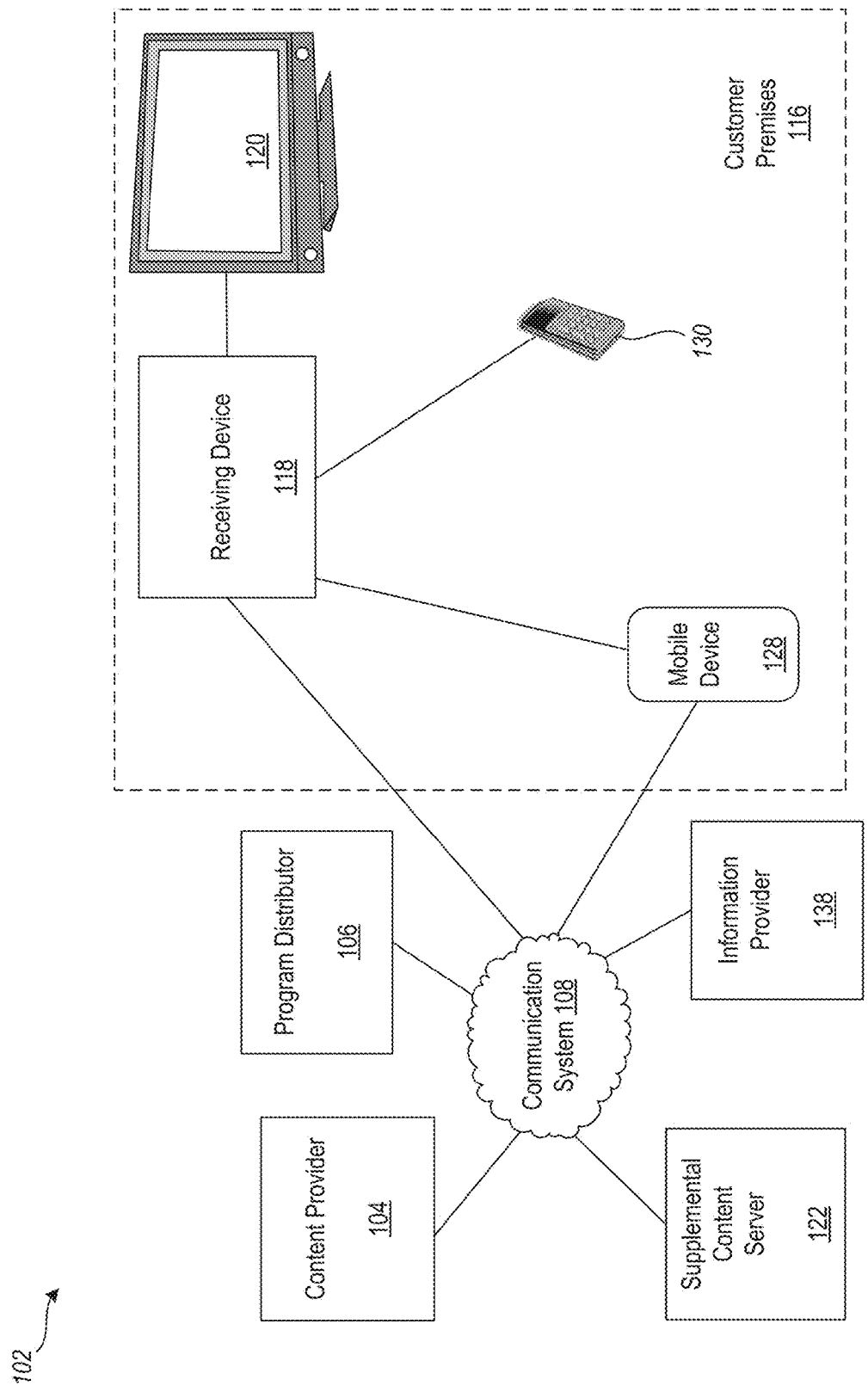
FIG. 1 is an overview block diagram illustrating a technical environment in which embodiments of systems and methods for generating supplemental content for a program content stream may be implemented, according to an example embodiment.

FIG. 1 is an overview block diagram illustrating a technical environment 102 in which embodiments of systems and methods for generating supplemental content for a program content stream may be implemented, according to an example embodiment.

Before providing additional details regarding the operation and constitution of systems and methods for generating supplemental content for a program content stream, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided as a program content stream for use by a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider or Internet service provider outside the customer premises 116, and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108. Also, the receiving device 118 may be configured to receive, process and display on the presentation device 120 streaming media content received directly from the satellite or cable television service provider and/or other content provider 104.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider or other source outside the customer premises 116 and communicate that programming to another device. Further, the receiving device 118 may itself include user interface devices, such as buttons or switches. In some example embodiments, the receiving device 118 may be configured to receive and decrypt content and/or software or firmware updates according to various digital rights management (DRM) and other access control technologies and architectures as part of or in addition to the process of generating supplemental content for a program content stream, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smartphone, mobile device or other computing device or media player, and the like. Presentation devices 120 employ a display, one or more speakers, and/or other output devices to communicate video and/or audio content to a user. In some embodiments, presentation devices 120 employ a microphone, keyboard, and/or other input devices to communicate commands or other input to the presentation device 120 and/or receiving device 118. In many implementations, one or more presentation devices 120 reside in or near a customer premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In many embodiments, a remote-control device (remote control) 130 is operable to control the receiving device 118 and/or the presentation device 124. The remote control 130 typically communicates with the receiving device 118 using a suitable wireless medium, such as infrared (IR), radio frequency (RF), or the like. The remote control 130 may include a microphone that may be voice or audio activated in order to receive commands or other voice input. In some embodiments, such voice input may be communicated to and used by the receiving device 118, presentation device 120 and/or mobile device 128 and cause such devices to perform other actions. For example, such voice input may be processed by the receiving device 118, presentation device 120 and/or mobile device 128 as an answer or other response to supplemental content presented by such systems. In some embodiments, the remote 130 may be a voice-enabled remote and the same microphone may also be used to receive voice commands from the user and transmit corresponding commands to the receiving device 118 to control the receiving device 118 and/or other peripheral devices.

In the example embodiment shown in FIG. 1, handheld mobile device 128 may be communicatively connected to the television receiving device 118 via a physical or a peer-to-peer short range wireless connection. For example, mobile device 128 may be a handheld mobile device of a user (e.g., a customer of a satellite, cable or streaming media subscription service associated with customer premises 116 or other user) such as a smartphone, tablet device or other computing or communications device. There may be fewer or additional mobile devices in various embodiments. The mobile device 128 may communicate over communication system 108 with the television receiving device 118, program distributor 106, content provider 104, supplemental content server 122 and/or information provider 138 using the transmission control protocol/Internet protocol (TCP/IP) suite of networking communication protocols or other communication protocols. The mobile device 128 may also or instead communicate directly with the receiving device 128, remote control 130 and/or presentation device 120 over one or more short range wireless networks or peer-to-peer networks. In the present example, a cable or satellite television service provider may encompass or be in communication with some or all of the content provider 104, program distributor 106, supplemental content server 122, and information provider 138.

In particular, a content provider 104 provides program content, such as television content, to a distributor, such as the program distributor 106. Example program distributors include, but are not limited to, satellite and cable television service providers. Example content providers include television stations which provide local or national television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that is ultimately communicated to the receiving device 118 as a program content stream. Various embodiments of the receiving device 118 may receive programming from program distributors 106 and/or directly from content providers 104 via locally broadcast radio, RF signals, cable, fiber optic, Internet media, or the like via the communication system 108.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through other channels using terrestrial, satellite signal, and cable television formats of the communication system 108. In various example embodiments, such technologies are deployed within the environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at a content storage system of a content delivery network operably coupled to the communication system 108, under direct or indirect control of the program distributor 106, to the receiving device 118. Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or downloading to a receiving device 118 such as a computer, DVR (also called a personal video recorder) or portable media player for viewing at any time.

In some embodiments, the receiving device 118 may be a set-top box that is typically provided by the cable provider, satellite provider, or other program distributor 106 to which the customer may subscribe to receive such television services and that also receives programming through other channels using a terrestrial, satellite signal, and/or cable television format. The mobile device 128 in communication with the receiving device 118 may be provided by the program distributor, such as a cable provider or satellite provider. However, in some instances, such mobile devices may be devices other than those provided by the program distributor 106. For example, these may include various user devices such as a tablet device, game machine, smartphone, mobile device or other computing device or media player or communications device not provided by or controlled by the cable provider, satellite provider, or other program distributor to which the customer subscribes for the television services.

The supplemental content server 122 is operably coupled to the communication system 108 and may be a system of an entity that provides processing and/or analysis of a program content stream sent to receiving device 118 and may also generate supplemental content for the program content stream as the program content stream is being received by the receiving device 118 based on the processing of the verbal content of the program content stream. The supplemental content server 122 may then communicate to the receiving device 118 results of such processing and/or analysis of the program content stream. The supplemental content server 122 may also or instead transmit generated supplemental content for the program content stream as the program content stream is being delivered to and/or received by the receiving device 118. The environment 102 may include many systems associated with a television service provider, such as the program distributor 106, that operate in a manner such as the supplemental content server 122 described herein, and the supplemental content server 122 represents one or more of such systems in various embodiments. Such functionality may also or instead be performed by the receiving device 118, mobile device 128 and/or remote control device 130.

In addition, information provider 138 may provide various forms of content and/or services to various devices residing in the customer premises 116. For example, information provider 138 may provide information to the receiving device 118 regarding customer or user accounts associated with the program content stream and/or receiving device 118; corresponding user preferences and settings; and/or additional processing of the program content stream to enable the receiving device 118 and/or supplemental content server 122 to generate corresponding supplemental content. Such services may include artificial intelligence and machine learning functionality to improve the supplemental content in general and for particular programs based on a feedback loop from the receiving device 118, mobile device 128 and/or receiving devices and mobile devices of other users.

The above description of the environment 102, the customer premises 116, and the various devices therein, is intended as a broad, non-limiting overview of an example environment in which various embodiments of generating supplemental content for a program content stream may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different supplemental content servers, content providers, program distributors and information providers that operate in a corresponding manner as the supplemental content server 122, the content provider 104, program distributor 106 and information provider 138 as described herein. Each of supplemental content server 122, the content provider 104, program distributor 106 and information provider 138 may represent one or more of such systems in various embodiments.

Example embodiments described herein provide applications, tools, data structures and other support to implement generating supplemental content for a program content stream. Other embodiments of the described techniques may be used for other purposes, including generating supplemental content for formal educational programs in schools and for remote learning, generating supplemental content for sports programs, movies, news programs and other types of content. For example, sports programs often have multiple announcers who typically identify themselves. Therefore, the system may recognize the particular announcer's voice and generate questions or other supplemental content based on individual announcers. In the example regarding sports announcers, the system may present a question based on the verbal content in the sports program of the recognized sports announcer, such as the question "Bob Costas thought this was the best play of the game. A,B,C". There may be unique scenarios for other types of content. For example, for news content, there may be a current events quiz presented during or at the end of a news program generated in real-time based on the content of the news program. Also, multiple users may communicate individual answers or other responses to questions or other supplemental content presented on a common presentation device and/or individual mobile devices or computer of each user. In such embodiments, games or competitions (e.g., to answer the most questions correctly or the fastest) managed and/or controlled by the receiving device 118, supplemental content server 122, content provider 104, program distributor 106 and/or information provider 138 may be played between the users, such as between students in a class, or between multiple players remotely over communication system 108.

In an example embodiment for an education setting, the system may automatically generate quiz print outs for teachers when not all students have mobile devices. These printouts may be generated from previous natural language processing (NLP) of content stored and sent in the metadata associated with the content. For example, an application running on the mobile device 128 and/or the receiving device 118 may connect to a wireless local printer so students can follow along and answer while watching on the presentation device 120 and/or an individual mobile device 128. In one embodiment, the printouts may include multiple choice questions or configured in a way that they are easily readable and scored via the application running on the mobile device 128 by taking a photo of it. The application running on the mobile device 128 and/or receiving device 118 may record and display student scores and rankings within a very short time, on the screen of the presentation device 120 or on the screen of the mobile device 128 via the application running on the mobile device 128.

Also, generating supplemental content for a program content stream may be performed by various other devices, such as audio and DVD players, digital recorders, computers, peripherals, televisions, mobile devices, active speakers, headphones, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
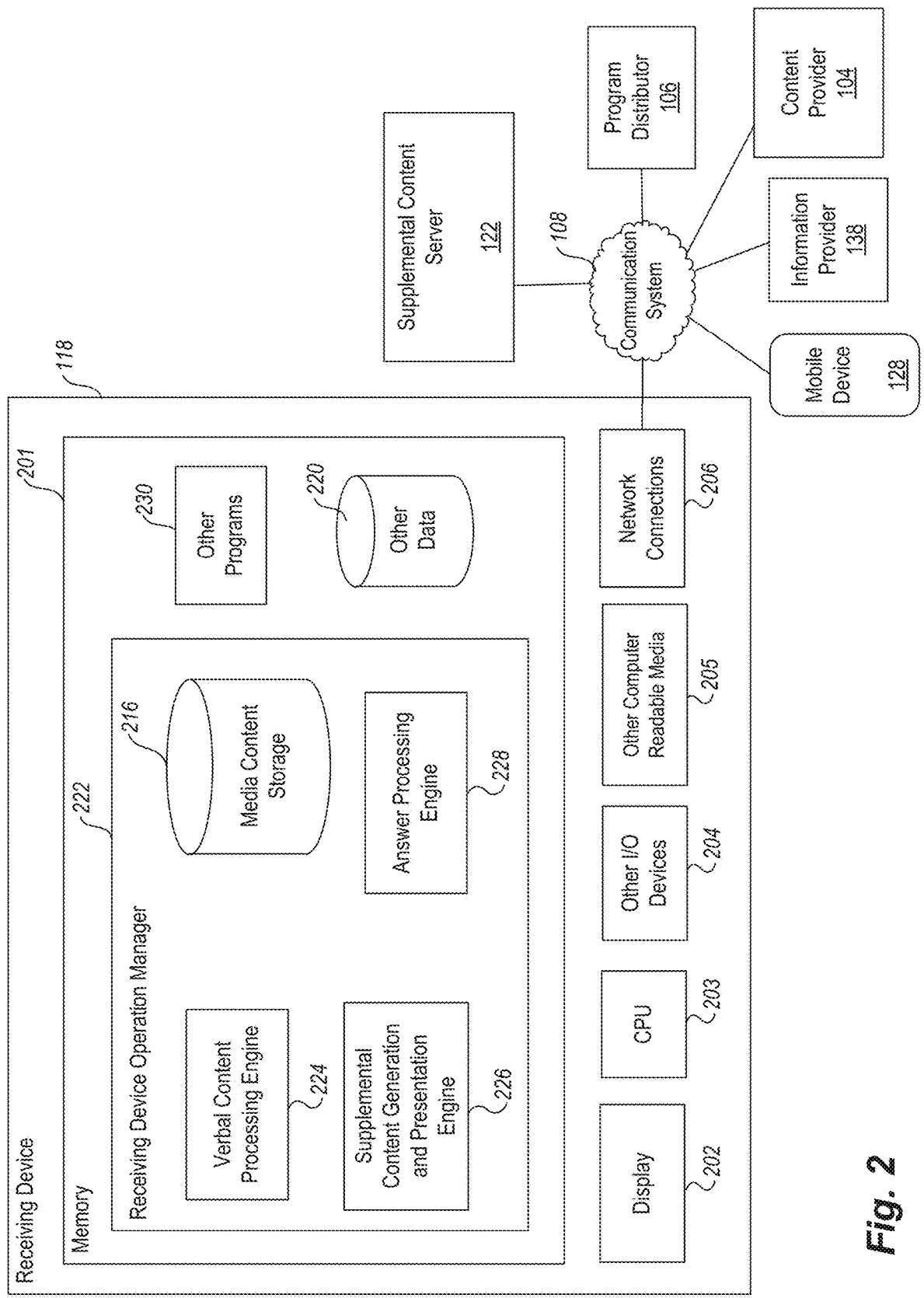
FIG. 2 is a block diagram illustrating elements of an example receiving device used in systems and methods for generating supplemental content for a program content stream, according to an example embodiment.

FIG. 2 is a block diagram illustrating elements of an example receiving device 118 used in secure communications between media devices, according to one example embodiment.

In one embodiment, the receiving device 118 is a device such as a set-top box, television, DVR, DVD player, PC, tablet device, game machine, smartphone, mobile device or other computing device or media player configured to receive programming via a connection to a satellite or cable television service provider, or other media content provider, outside the customer premises and to display such programming on a presentation device. For example, the receiving device 118 may be configured to receive, process and display on a presentation device 120 streaming media content received directly from the satellite or cable television service provider and/or other programming received directly from the satellite or cable television service provider such as cable or satellite television broadcasts via various other physical and logical channels of communication.

Note that one or more general purpose or special purpose computing systems/devices may be used to operate the receiving device 118; store information regarding the receiving device 118, store metadata; perform DRM and key management operations, decrypt and encrypt received content; pair with various mobile devices on a home LAN and/or over the Internet; establish connection between the receiving device 118 and various mobile devices; communicate data, including programming, between the receiving device 118 and various mobile devices (including mobile device 128) via the home LAN and/or Internet; and communicate with the content provider 104, program distributor 106, information provider 138 and/or supplemental content server 122. In addition, in some embodiments, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as well as the establishing of an Internet Layer end-to-end security connection, such as a secure IP tunnel, over the home LAN and/or Internet between the receiving device 118 and various mobile devices and communication of data, including programming, between the receiving device 118 and various mobile devices via the Internet Layer end-to-end security connection over the home LAN and/or Internet, as described herein. The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various on-demand service software applications stored in memory 201 and on various mobile devices. The receiving device operation manager 222 also facilitates communication with peripheral devices such as a remote control, via the I/O devices 204, and with the mobile device 128 and remote systems (e.g., the content provider 104, the supplemental content server 122, the program distributor 106, and/or the information provider 138) via the network connections 206.

Recorded or buffered programming of a program content stream received as streaming media content or other types of programming may reside on the media content storage 216, either in decrypted or encrypted form as applicable for securely storing, processing and displaying of the received media content according to the applicable DRM associated with the particular programming. The media content storage 216 may also store various generated supplemental content, program metadata associated with the recorded or buffered programming and/or supplemental content stored in the media content storage 216, such as that including, but not limited to, generated questions having answers that are extracted educational concepts communicated by the verbal content of the program content stream; answers to such questions; DRM data; tags; codes, identifiers, format indicators, timestamps, user identifications, authorization codes, digital signatures, etc.

The verbal content processing engine 224 is configured to receive the program content stream via the network connections 206 and/or other I/O devices 204 and process verbal content of the program content stream as the program content stream is being received. For example, the verbal content processing engine 224 may extract audio and/or textual verbal content from the program content stream, convert or transcribe the extracted audio to text and then immediately process such data while the content of the program content stream is being output by the receiving device 118 for presentation on the presentation device 120. For example, in one embodiment, the verbal content processing engine 224 may extract textual content from the program content stream via accessing the closed captioning and/or subtitle metadata associated and/or received with the program content stream. Such textual data may have been previously inserted in the vertical blanking interval of the television signal comprising the program content stream. In other embodiments, the verbal content processing engine 224 may perform speech-to-text conversion of the extracted audio of the program content stream as the program content stream is being received by the receiving device 118.

In one embodiment, the verbal content processing engine 224 may perform natural language processing (NLP) on the extracted textual content or extracted audio that has been converted to text as the program content stream is being output for presentation on a presentation device, such as presentation device 120. NLP is a branch of artificial intelligence that helps computers understand, interpret and manipulate human language. NLP may use representation learning and deep neural network-style machine learning methods to recognize concepts, topics, facts, and statements made in the verbal content of the program content stream. Such techniques can perform many such natural language tasks, for example in language modeling, parsing, and many others. Some techniques include the use of word embeddings to capture semantic properties of words, and an increase in end-to-end learning of a higher-level task (e.g., question answering) instead of relying on a pipeline of separate intermediate tasks (e.g., part-of-speech tagging and dependency parsing). Deep neural network-based approaches may be used instead of or in addition to distinct statistical natural language processing. With neural machine translation (NMT), deep learning-based approaches to machine translation directly learn sequence-to-sequence transformations, obviating the need for intermediate steps such as word alignment and language modeling that are used in statistical machine translation (SMT). For example, the verbal content processing engine 224 may perform NLP on the text associated with the program content stream to extract educational concepts communicated by the text. For example, the NLP of the text may recognize that the text, "Lions typically live in the wild for 10-14 years" is a grammatical statement that may serve as a basis for, or may be paired to, a corresponding educational question, "How long do lions live for?" The verbal content processing engine 224 may then store such question and answer associations and/or pairings in the media content storage 216 or data repository 220. The verbal content processing engine 224 may communicate such question and answer associations and pairings, as such associations are made, to the supplemental content generation and processing engine 226 for immediate further processing.

The supplemental content generation and processing engine 226 then generates supplemental content for the program content stream as the program content stream is being received based on the output of the verbal content processing engine 224 that resulted from the processing of the verbal content of the program content stream. In some embodiments, the supplemental content generation and processing engine 226 may generate questions having answers that are one or more of the educational concepts communicated by the verbal content and that were extracted by the verbal content processing engine 224. For example, the supplemental content generation and processing engine 226 may select or generate the question "How long do lions live for?" based on the NLP of the verbal content of the program content stream. For example, the NLP of the verbal content of the program content stream may recognize that the text, "Lions typically live in the wild for 10-14 years" extracted from the verbal content is a grammatical statement that may serve as a basis for the question "How long do lions live for?" The supplemental content generation and processing engine 226 may iterate through all such associations made by verbal content processing engine 224 during the NLP of the program content stream, in order, as such associations are being made, such as to present the corresponding questions as the program content stream is being presented on the presentation device 120. This may be performed in real time or near real time as the program content stream is being output for presentation on the presentation device 120.

The supplemental content generation and processing engine 226 may cause the supplemental content to be presented as the program content stream is being output for presentation on the presentation device 120. In some embodiments, the supplemental content generation and processing engine 226 may cause the receiving deice 118 to pause the presentation of the program content stream on the presentation device 120 and, in response to the pausing the presentation of the program content stream on the presentation device 120, cause the corresponding question be presented on the presentation device 120. The program content stream may be buffered in the media content storage 216 or data repository 220 while it is paused such that after the program is un-paused or otherwise resumed, the receiving device 118 can present the program content stream on the presentation device 120 and/or mobile device 128 beginning from the point it was paused. The supplemental content generation and processing engine 226 may select particularly relevant or convenient points in the program content stream to pause the presentation in order to present the question. For example, the supplemental content generation and processing engine 226 may select a point in the program immediately before or after a commercial break, a point in the program related to the question and/or a point in the program designated for insertion of supplemental content. In some embodiments, the question may be presented in response to the user pausing the program or otherwise providing input that may indicate the question may be presented.

In some embodiments, the supplemental content generation and processing engine 226 may cause a video portion of the program content stream to be presented that is relevant to a particular question while the question is being presented. The supplemental content generation and processing engine 226 may cause this to occur while the presentation of the program content stream is paused in order for the question to be presented. For example, if a question regarding lions is presented, a video clip or image from the program related to lions (or perhaps even including information answering or hinting at the answer to the question) may be presented on the presentation device 120 and/or mobile device 128 while the question is being presented on the presentation device 120 and/or mobile deice 128. Such associations between generated questions and content related or relevant to the questions may be made as a result of the NLP of the verbal content of the program content stream in conjunction with object detection and recognition processing of the program content stream by the supplemental content generation and processing engine 226 in order to recognize relevant objects or video scenes in the program content stream.

In some embodiments, the supplemental content generation and processing engine 226 may generate various types of supplemental content based on the NLP of verbal content and/or object detection and recognition processing of other objects or scenery in the content of the program content stream performed by the supplemental content generation and processing engine 226. Such supplemental content may include, but is not limited to: questions; fun facts; trivia; additional information about topics, subjects, objects, people or places recognized in the content of the program content stream; purchase opportunities related to topics, subjects, topics, subjects, objects, people or places recognized in the content of the program content stream; games related to topics, subjects, objects, people or places recognized in the content of the program content stream; and advertisements related to topics, subjects, objects, people or places recognized in the content of the program content stream.

The supplemental content generation and processing engine 226 may cause an interactive element to be presented with the question such that the user may select an answer to the question via the interactive element. For example, a multiple choice question may be presented on the presentation device 120 with the answers being selectable by the user with the remote control 30 and/or the mobile device 128. In some embodiments the questions are also or instead presented on the mobile device 128 of the user. In some embodiments where the questions are also or instead presented on the mobile device 128 of the user, the program content stream is not paused, such that the user may continue to watch the programming on the presentation device 120 (e.g., on their television) while looking to their mobile device 128 to view and answer the question related to the program content stream.

As the program content stream is being output by the receiving device 118 for presentation and being presented on the presentation device 120 and/or mobile device 128, the supplemental content generation and processing engine 226 may pause the presentation of the program content stream on the presentation device 120 and/or mobile device 128 at various different times during the presentation of the program content stream. The supplemental content generation and processing engine 226 may cause a different question of the generated questions to be presented on the presentation device 120 and/or or on the mobile device 128, at each of the various different times the presentation of the program content stream is paused on the presentation device 120 and/or mobile device 128.

In some embodiments, the supplemental content generation and processing engine 226 may customize the questions and other supplemental content according to the preferences and corresponding settings of a specific user. The supplemental content generation and processing engine 226 may receive input indicative of a selection of one or more of: an age level of a user that is to view the supplemental content; a number of questions comprising the supplemental content for a particular program of the program content stream; and a frequency of presentation of items comprising the supplemental content. The supplemental content generation and processing engine 226 may then cause the supplemental content to be presented as the program content stream is being output for presentation on the presentation device 120 and/or the mobile device 128 based on the input. For example, the supplemental content generation and processing engine 226 may select questions to be presented that are categorized at a particular difficulty level associated with the age level input by the user. Also, the supplemental content generation and processing engine 226 may determine to present only 3 questions per television program based on an input of a user indicating a frequency of 3 questions per television program. Additionally, the supplemental content generation and processing engine 226 may determine to present a particular number of questions to present for a particular program based on input from a user indicating how many questions are to be presented based on the name, title or content of the specific program.

The supplemental content generation and processing engine 226 may also store the generated supplemental content as metadata associated with the program for subsequent presentation when the program is played again for the viewer or other viewers, thus further increasing efficiency of generating further supplemental content. For example, the supplemental content generation and processing engine 226 may store, in media content storage 216 and/or data repository 220, the generated questions as metadata associated with a corresponding episode of a television program of the program content stream. Such generated questions may be stored for presentation as supplemental content of the corresponding program episode during subsequent playback of the program episode on presentation device 120, mobile device 128 and/or other devices of other users or customers.

After the supplemental content generation and processing engine 226 causes the supplemental content to be presented as the program content stream is being output for presentation on the presentation device 120 and/or the mobile device 128, the answer processing engine 228 may receive an input indicative of an answer to the question. In some embodiments, the input may originate as voice input to the remote control 130, receiving device 118 and/or the mobile device 128. In such embodiments, the remote control 130, receiving device 118 and/or the mobile device 128 may incorporate and/or use use corresponding voice-command, voice-enabled, speech recognition and/or voice recognition functionality to recognize and process voice commands and/or other speech accordingly. For example, the remote control 130 may be a voice-enabled remote control device including a microphone that recognizes speech or relays relevant audio to the receiving device 118 in order for the answer processing engine 228 of the receiving device 118 to recognize the speech as an answer to the question presented.

In some embodiments, the supplemental content generation and processing engine 226 may cause an interactive element to be presented with the question such that the user may select an answer to the question via the interactive element. For example, a multiple choice question may be presented on the presentation device 120 and/or the mobile device 128 with the answers being selectable by the user with the remote control 30, receiving device 118 and/or the mobile device 128. Input indicative of selection of an answer, such as a click, press or voice selection, may then be communicated to the answer processing engine 228. The answer processing engine 226 may then determine a response to the answer and communicate the response to the answer. For example, the answer processing engine 228 may communicate the response visually on the presentation device 120 and/or mobile device 128. In some embodiments, the presentation of the program content stream is paused while the question is being presented and the answer processing engine 228 causes the presentation of the program content stream to resume in response to, or otherwise based on, an answer being received to the question. In other embodiments, the resumption of the presentation of the program content stream may be in response to an answer being received to the question or the answer processing engine 228 determining that a timer has expired, whichever occurs first.

In some embodiments, the resuming of the presentation of the program content stream may be in response to the answer processing engine 228 determining that the answer to the selected question is correct. In some embodiments, the answer processing engine 228 may compare the input indicative of the answer to the question to an educational concept associated with the question presented on the presentation device 120 and/or mobile device 128. This may be performed while the presentation of the program content stream is paused. The answer processing engine 228 may then determine whether the answer to the selected question is correct based on the comparison while the presentation of the program content stream is paused. The answer processing engine 228 may also determine the response to the answer based on the determination of whether the answer to the selected question is correct while the presentation of the program content stream is paused. In some embodiments, the answer processing engine 228 causes the presentation of the program content stream to resume in response to communicating a response to the answer. The answer processing engine 228 may resume the presentation of the program content stream on the presentation device 120 and/or mobile device 128 after each of the various different times the presentation of the program content stream is paused in response to receiving a corresponding correct answer to a question presented on the presentation device 120 and/or on the mobile device 128 at each of the various different times the presentation of the program content stream is paused.

In some embodiments, in response to receiving an incorrect answer, the answer processing engine 228 may display or otherwise communicate to the user the answer was incorrect, may display or otherwise communicate to the user the correct answer and/or may replay the portion of the content that states, illustrates or otherwise includes the correct answer. For example, this may be accomplished by the answer processing engine 228 finding the portion of content including the correct answer using a timestamp corresponding to the location in the content where the correct answer is included. When generating the supplemental content including the question and correct answer, the supplemental content generation and processing engine 226 may record such timestamps that indicate where in the content the corresponding verbal content associated with the correct answer appears and associate the timestamp with the question and corresponding correct answer. The answer processing engine 228 may then access such timestamp to locate the content that includes the correct answer and then play such content in response to receiving an incorrect answer and/or in response to a request from the user to view the content including the correct answer.

In some embodiments, the answer processing engine 228 controls an amount of viewing time allowed on the presentation device 120 and/or one or more mobile devices (such as mobile device 128), based on a number of correct answers to the different questions presented on the presentation device 120 and/or on a mobile device of the user received at each of the various different times the presentation of the program content stream is paused on the presentation device. In some embodiments, the answer processing engine 228 may be in communication with and/or control the mobile device 128 and/or other mobile devices associated with the receiving device 118. The answer processing engine 228 may also have control over or have access to a user account that is associated with the receiving device 118 and/or the mobile device 128. In other embodiments, the answer processing engine 228 may also or instead be running on the mobile device 128. For example, a parent may select parental controls available on the receiving device 118 and/or mobile device 128 that limit the viewing time or "screen time" of one or more devices or an account associated with a child to 5 hours per week until 50 supplemental content questions have been correctly answered within that week, which may then be increased to 7 hours for that week. The number of viewing hours, number of correctly answered questions and rate of increase or decrease of allowed viewing time may be selectable by the user via a user interface or portal generated or provided by the answer processing engine 228 of the receiving device 118, the program distributor 106, the content provider 104, information provider 138 and/or supplemental content server 122.

Other code or programs 230 (e.g., further audio/video processing modules, a program guide manager module, a Web server, and the like), and potentially other data repositories, such as data repository 220 for storing other data (user profiles, preferences and configuration data, etc.), may also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 include an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, a remote control 130, the mobile device 128, program distributor 106, content provider 104, information provider 138, supplemental content server 122 or some other module. In this manner, the API may facilitate the development of third-party software, such as various different on-demand service applications, user interfaces, plug-ins, adapters (e.g., for integrating functions of the receiving device operation manager 222 and information provider 138 into mobile device and/or desktop applications), and the like to facilitate generating supplemental content for a program content stream using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to perform NLP of content of a program content stream as the as the program content stream is being output for presentation on a presentation device; extract educational concepts communicated by verbal content of the program content stream based on the performing of the natural language processing of the verbal content; and cause questions based on the extracted educational concepts to be presented on the presentation device or a mobile device of a user at different times while the presentation of the program content stream is paused.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figures 3A, 3B:
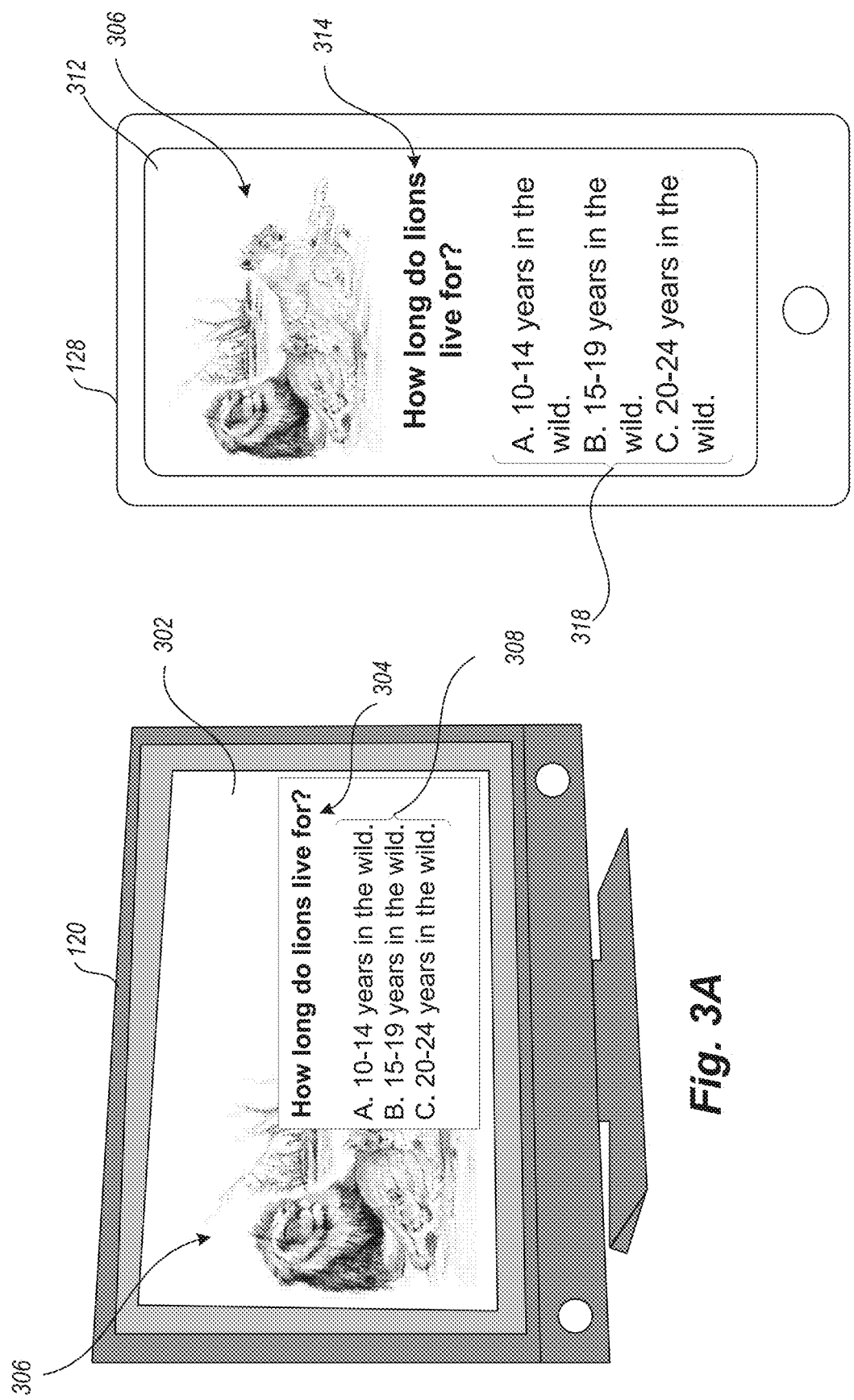
FIGS. 3A and 3B are diagrams of an example presentation device and an example handheld mobile device, respectively, illustrating respective example user interface screens shown in a presentation of an example question as supplemental content for a program content stream, according to an example embodiment.

FIGS. 3A and 3B are diagrams of an example presentation device 120 and an example handheld mobile device 128, respectively, illustrating example user interface screens shown in a presentation of an example question as supplemental content for a program content stream, according to an example embodiment.

In the example shown, the receiving device 118 (shown in FIG. 1 and FIG. 2 connected to the presentation device 120 and handheld mobile device 128) is outputting a program content stream to the presentation device 120 including an educational program 306 about the life of lions in the wild in Africa. While outputting a program content stream to the presentation device 120, the receiving device 118 has extracted the audio of the program 306 and performed NLP on the verbal content of the program 306. The receiving device 118 has generated a question "How long do lions live for?" 304 based on the NLP of the audio extracted from the program 306. The receiving device 118 has presented the question "How long do lions live for?" 304 along with multiple choice answers 308 to the question 304 on the presentation device screen 302 as an overlay on top of the program 306.

In the example embodiment shown, the receiving device 118 has paused the presentation of the program 306 while presenting the question 304 so that the viewer may have time to answer the question 304 without missing any of the program 306. As shown in FIG. 3B, a corresponding question 314 and associated corresponding multiple choice answers 318 are also being presented on a mobile device screen 312 of the mobile device 128 of the user, who may also be viewing the program 306 on the presentation device 120. In some embodiments, the question may instead be presented only on the mobile device 128 or only on the presentation device 120. Also, the program 306, a scene from the program 306, an image from the program 306 or other related content may be presented along with the corresponding question 314 on the mobile device 128 and/or along with the question 304 on the presentation device 120. In embodiments where the program 306 is also or instead presented on the mobile device 128, the mobile device 128 may pause the presentation of the program 306 on the mobile device 128 while presenting the corresponding question 314. In some embodiments, the program 306 may continue to play on the presentation device 120 while the corresponding question 314 is presented only on the mobile device 128, such that the user may continue to view the program 306 on the presentation device 120 while looking to their mobile device 128 to view and answer the corresponding question 314 related to the program 306.

The user may respond to the question 304 presented on the presentation device 120 and/or the corresponding question 314 presented on the mobile device 128 in a variety of manners. In some embodiments, the remote control 130, the receiving device 118, the presentation device 120 and/or the mobile device 128 are equipped with a microphone and voice-enabled such that the user may respond by speaking the answer to the question 304 and/or corresponding question 314. For example, the presentation of the question 304 on the presentation device 120 and/or the corresponding question 314 on the mobile device 128 may trigger the remote control 130, the receiving device 118, the presentation device 120 and/or the mobile device 128 to start listening for an answer.

In some embodiments, the multiple choice answers 308 presented on the presentation device 120 and/or the corresponding multiple choice answers 318 presented on mobile device 128 are selectable interactive user interface elements, such that the user may select the answer by using the remote control 30, touching the selection if the presentation device screen 302 or mobile device screen 312 is a touch screen, clicking on the selection using an input device such as a mouse, and/or selecting the desired answer using another input device. In some embodiments, if the answer is selected on the mobile device 128, the selection may be communicated to the receiving device 118 and/or presentation device 120 via communication system 108 shown in FIG. 1.

Figure 4B:
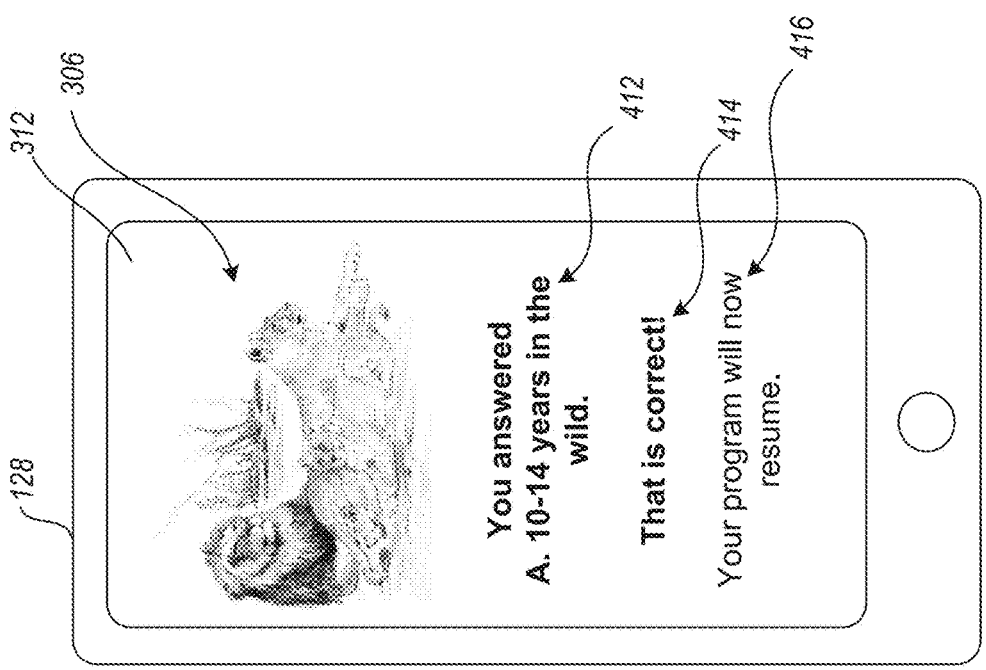
FIGS. 4A and 4B are diagrams of an example presentation device and an example handheld mobile device, respectively, illustrating respective example user interface screens shown in an example presentation of a response to an answer received to the example question presented in FIGS. 3A and 3B, according to an example embodiment.
Figure 4A:
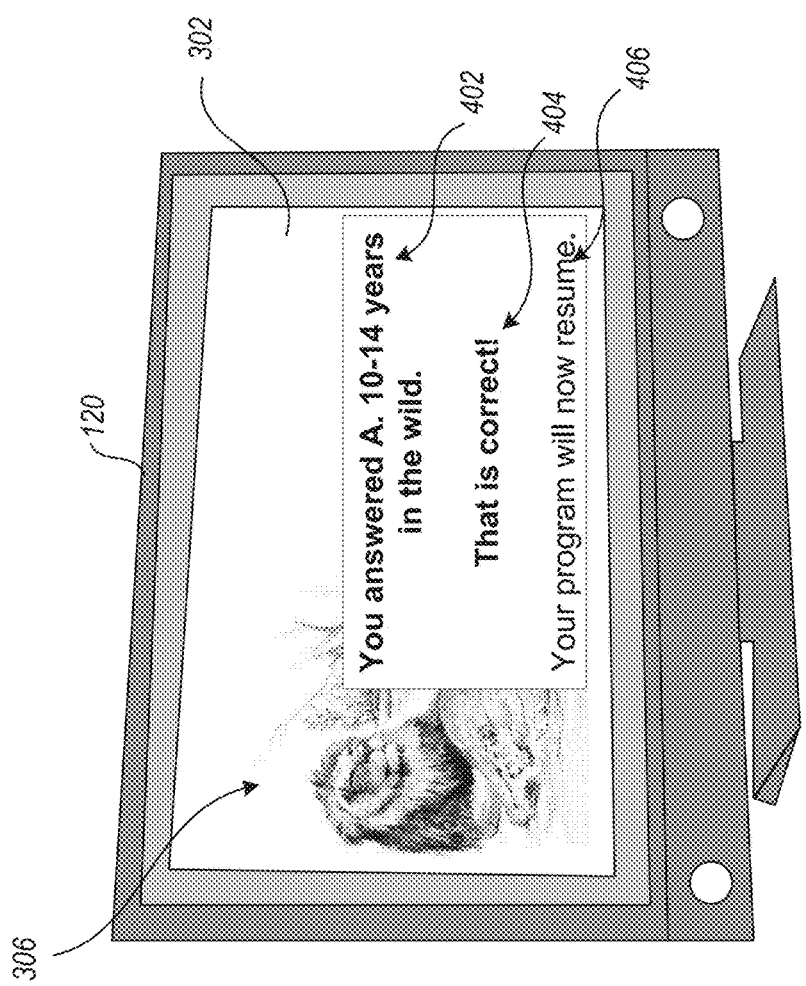

FIGS. 4A and 4B are diagrams of an example presentation device 120 and an example handheld mobile device 128, respectively, illustrating example user interface screens shown in an example presentation of a response to an answer received to the example question presented in FIGS. 3A and 3B, according to an example embodiment.

As shown in FIGS. 4A and 4B, after the user answers the question 304 presented on the presentation device 120 and/or the corresponding question 314 presented on the mobile device 128, a response 404 is presented on the presentation device 120. In particular, in the example shown, the user has responded by speaking the choice "A", which the receiving device 118 (shown in FIG. 1 and FIG. 2 connected to the presentation device 120 and handheld mobile device 128) recognized as the correct answer. In response to receiving the correct answer, the receiving device 118 has presented the response "That is correct!" 404 on the presentation device screen 302. Also, a confirmation of the answer received 402 may be presented on the on the presentation device screen 302 to verify and reinforce learning. In response to receiving the correct answer, the receiving device 118 then resumes presentation of the program 306 on the presentation device screen 302. An indication that the program will resume 406 may also be presented on the presentation device screen 302.

In response to receiving the correct answer, the receiving device 118 and/or the mobile device 128 may cause a corresponding response "That is correct!" 414, a corresponding confirmation of the answer received 412 and a corresponding indication that the program will resume 416 to also or instead be presented on the mobile device screen 312. In some embodiments, the program may be resumed on the mobile device screen 312 and/or the presentation device screen 302 based on a preference of the user as indicated by an input or selection of a corresponding setting by the user on the mobile device 128 and/or the receiving device 118.

Figure 5B:
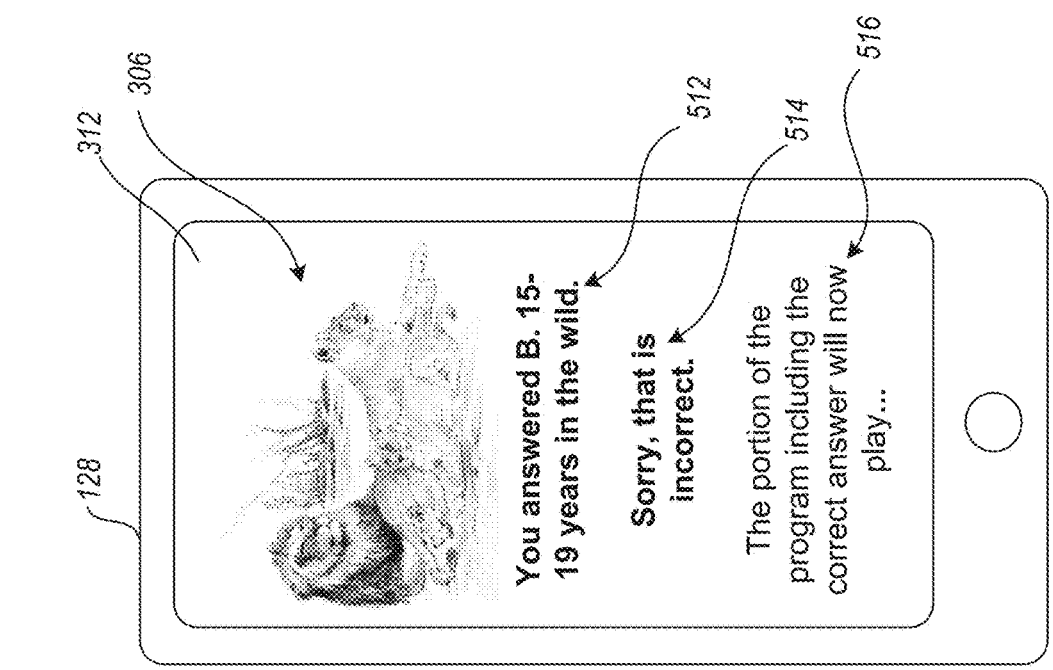
FIGS. 5A and 5B are diagrams of an example presentation device and an example handheld mobile device, respectively, illustrating respective example user interface screens shown in an example presentation of a response to an incorrect answer received to the example question presented in FIGS. 3A and 3B, according to an example embodiment.
Figure 5A:
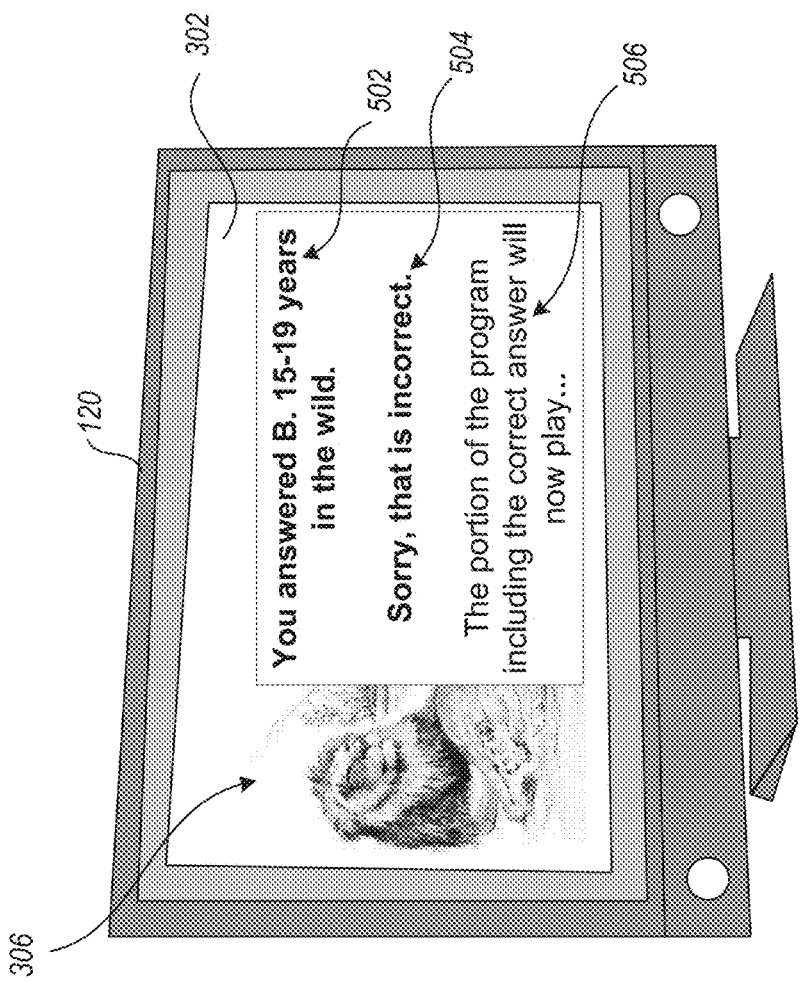

FIGS. 5A and 5B are diagrams of an example presentation device 120 and an example handheld mobile device 128, respectively, illustrating respective example user interface screens shown in an example presentation of a response to an incorrect answer received to the example question presented in FIGS. 3A and 3B, according to an example embodiment.

As shown in FIGS. 5A and 5B, after the user answers the question 304 presented on the presentation device 120 and/or the corresponding question 314 presented on the mobile device 128, a response 504 is presented on the presentation device 120. In particular, in the example shown, the user has responded by speaking the choice "B", which the receiving device 118 (shown in FIG. 1 and FIG. 2 connected to the presentation device 120 and handheld mobile device 128) recognized as an incorrect answer. In response to receiving the incorrect answer, the receiving device 118 has presented the response "Sorry, that is incorrect." 504 on the presentation device screen 302. Also, a confirmation of the answer received 502 may be presented on the on the presentation device screen 302 for verification. In response to receiving the incorrect answer, the receiving device 118 may then replay the portion of the program 306 that states, illustrates or otherwise includes the correct answer on the presentation device screen 302. An indication that the portion of the program including the correct answer will play 506 may also be presented on the presentation device screen 302.

In response to receiving the incorrect answer, the receiving device 118 and/or the mobile device 128 may cause a corresponding response "Sorry, that is incorrect" 514, a corresponding confirmation of the answer received 512 and a corresponding indication that the portion of the program including the correct answer will play 516 to also or instead be presented on the mobile device screen 312. In some embodiments, the portion of the program including the correct answer may play on the mobile device screen 312 and/or the presentation device screen 302 based on a preference of the user as indicated by an input or selection of a corresponding setting by the user on the mobile device 128 and/or the receiving device 118.

Figure 6:
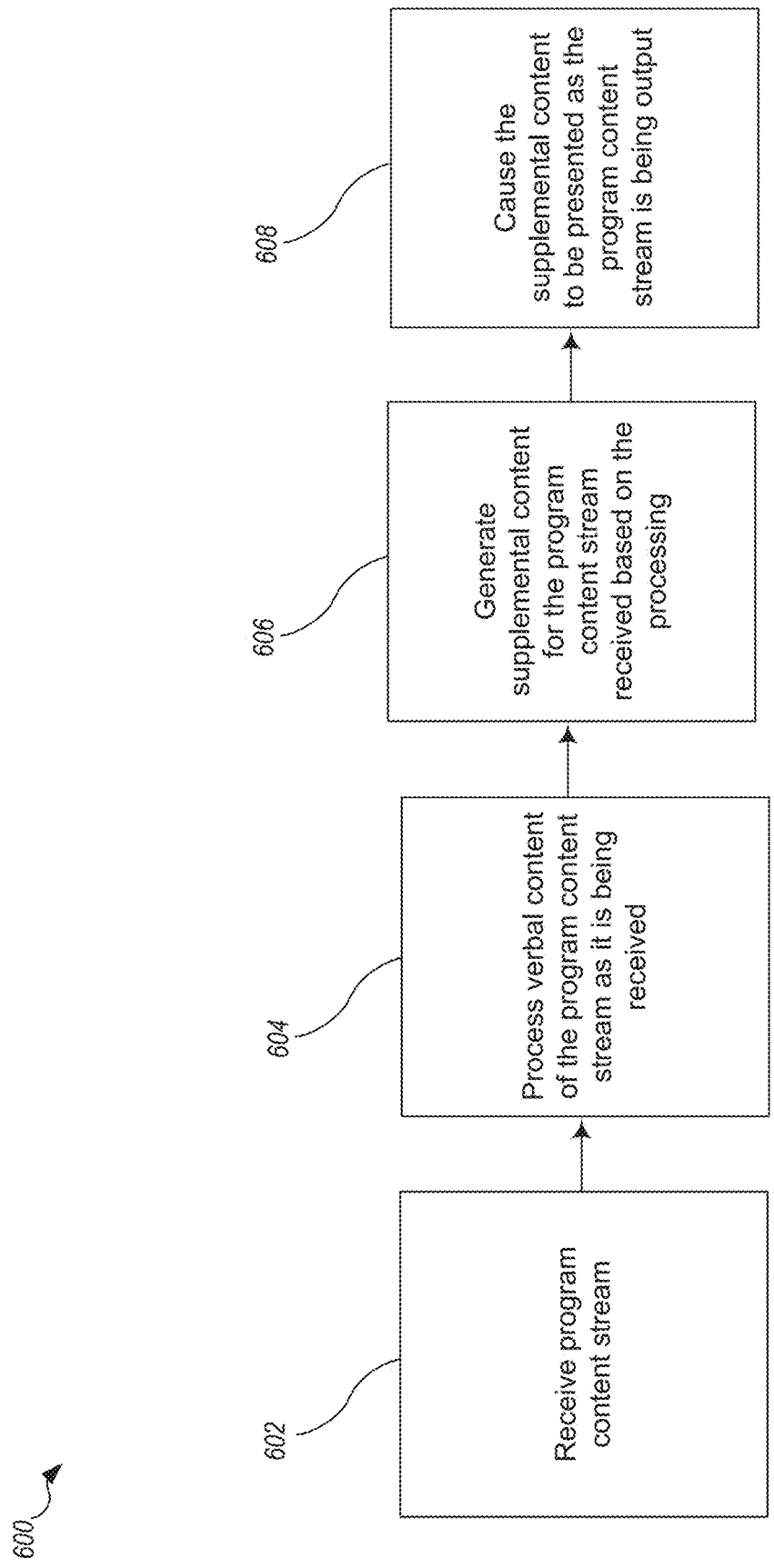
FIG. 6 is a flow diagram of an example method for generating supplemental content for a program content stream, according to an example embodiment.

FIG. 6 is a flow diagram of an example method 600 for generating supplemental content for a program content stream, according to an example embodiment.

At 602, a computerized system for generating supplemental content for a program content stream receives the program content stream.

At 604, the system processes verbal content of the program content stream as the program content stream is being received.

At 606, the system generates supplemental content for the program content stream as the program content stream is being received based on the processing of the verbal content of the program content stream.

At 608, the system causes the supplemental content to be presented as the program content stream is being output for presentation on a presentation device.

Figure 7:
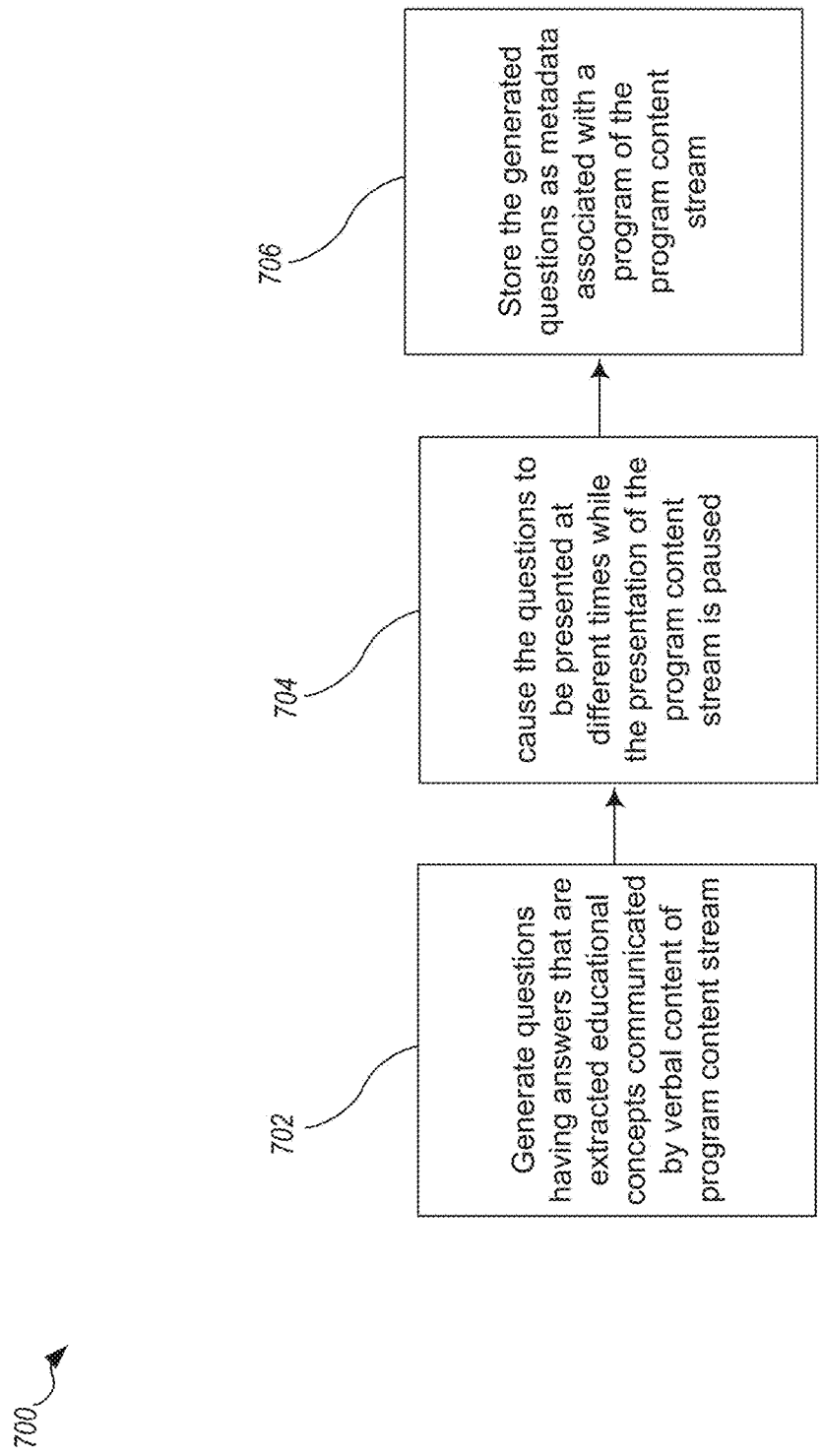
FIG. 7 is a flow diagram of an example method for storing generated questions as metadata associated with a program of the program content stream, according to an example embodiment.

FIG. 7 is a flow diagram of an example method 700 for storing generated questions as metadata associated with a program of the program content stream, according to an example embodiment.

At 702, a system for generating supplemental content for a program content stream generates questions, while a program content stream is being output for presentation on a presentation device. The questions have answers that are one or more extracted educational concepts communicated by verbal content of the program content stream.

At 704, the system causes the questions to be presented on the presentation device or a mobile device of a user at different times while the presentation of the program content stream is paused.

At 706, the system stores the generated questions, as metadata associated with a program of the program content stream, for presentation as supplemental content of the program during subsequent playback of the program.

Figure 8:
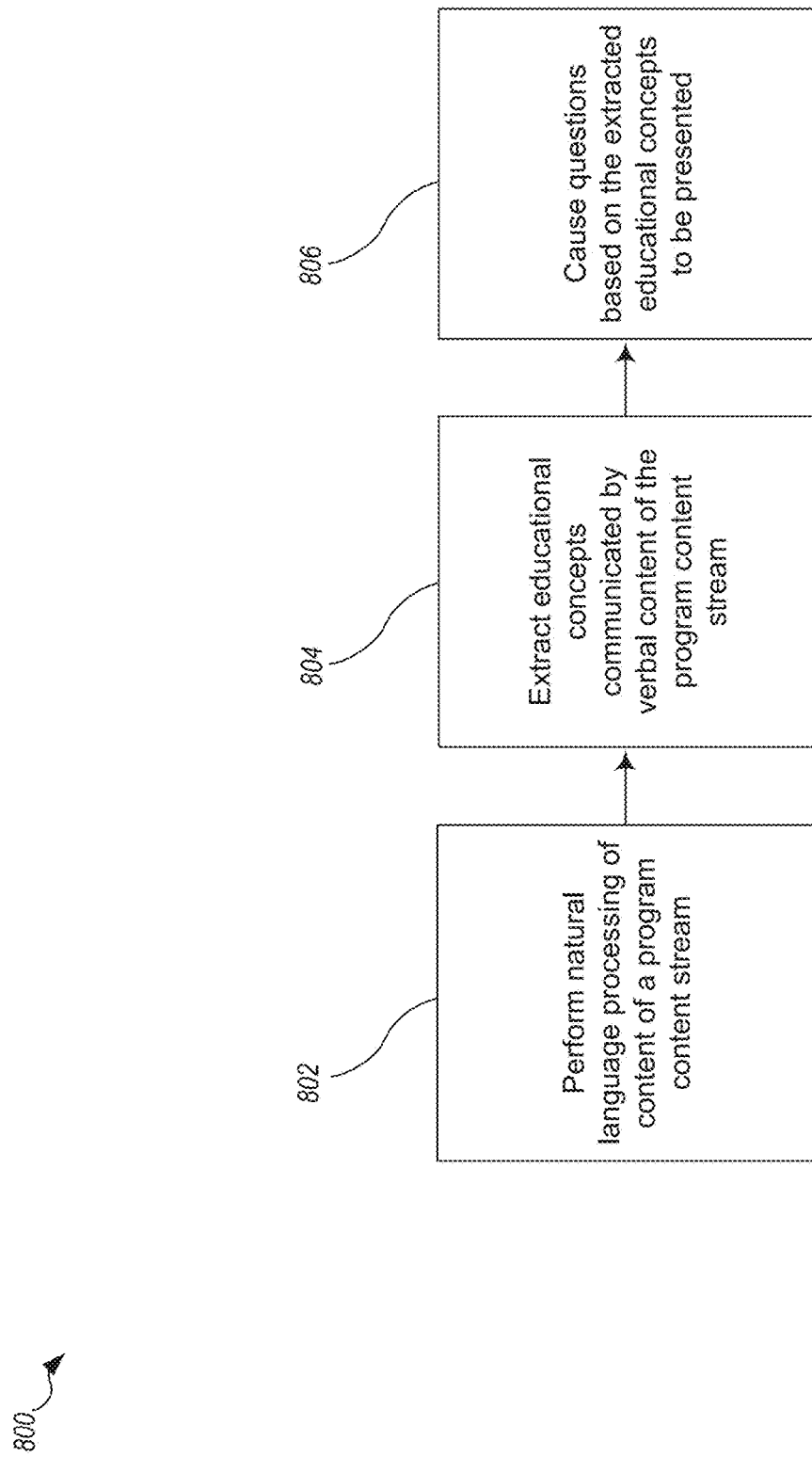
FIG. 8 is a flow diagram of an example method for extracting educational concepts communicated by verbal content of the program content stream, according to an example embodiment.

FIG. 8 is a flow diagram of an example method 800 for extracting educational concepts communicated by verbal content of the program content stream, according to an example embodiment.

At 802, a system for generating supplemental content for a program content stream performs natural language processing of content of a program content stream as the as the program content stream is being output for presentation on a presentation device.

At 804, the system extracts educational concepts communicated by verbal content of the program content stream based on the performing of the natural language processing of the verbal content.

At 806, the system causes questions based on the extracted educational concepts to be presented on the presentation device or a mobile device of a user at different times while the presentation of the program content stream is paused.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for generating supplemental content for a program content stream, comprising:
  receiving, by a computerized system for generating supplemental content, the program content stream;
  extracting, by the computerized system for generating supplemental content, audio representing verbal content of the program content stream as the program content stream is being received;
  extracting educational concepts communicated by the verbal content;
  generating, by the computerized system for generating supplemental content, supplemental content for the program content stream as the program content stream is being received based on the extraction of the audio representing verbal content of the program content stream, wherein the generating the supplemental content includes generating questions having answers that are one or more of the extracted educational concepts communicated by the verbal content;
  causing, by the computerized system for generating supplemental content, the supplemental content, including one or more of the questions, to be presented as the program content stream is being output for presentation on a presentation device;
  pausing the presentation of the program content stream on the presentation device at various different times during the presentation of the program content stream;
  causing a different question of the generated questions to be presented on the presentation device or on a mobile device of a user, at each of the various different times the presentation of the program content stream is paused on the presentation device,
  resuming the presentation of the program content stream on the presentation device after each of the various different times the presentation of the program content stream is paused in response to receiving a correct answer to a question presented on the presentation device or on a mobile device of the user at each of the various different times the presentation of the program content stream is paused on the presentation device; and
  controlling an amount of viewing time allowed on one or more of: the presentation device and one or more mobile devices of the user, based on a number of received correct answers to the different questions presented on the presentation device or on a mobile device of the user at each of the various different times the presentation of the program content stream is paused on the presentation device.

2. The method of claim 1 wherein the extracting educational concepts includes:
  performing natural language processing of audio content of the program content stream as the as the program content stream is being received; and
  extracting educational concepts communicated by the verbal content based on the performing of the natural language processing of audio content.

3. The method of claim 1 wherein the causing the supplemental content to be presented as the program content stream is being output for presentation on the presentation device includes:
  pausing the presentation of the program content stream on the presentation device; and
  in response to the pausing the presentation of the program content stream on the presentation device, causing the supplemental content to be presented on the presentation device.

4. The method of claim 1 wherein the causing the supplemental content to be presented as the program content stream is being output for presentation on a presentation device includes:
  pausing the presentation of the program content stream on the presentation device; and
  in response to the pausing the presentation of the program content stream on the presentation device, causing the supplemental content to be presented on a device of a user other than the presentation device.

5. The method of claim 1 wherein the causing the supplemental content to be presented as the program content stream is being output for presentation on the presentation device includes:
  selecting one or more of the generated questions to be presented while the presentation of the program content stream is paused;
  pausing the presentation of the program content stream on the presentation device; and
  in response to the pausing the presentation of the program content stream on the presentation device:
    causing a video portion of the program content stream to be presented that is relevant to the selected question; and
    causing the selected question to be presented on the presentation device while the presentation of the program content stream is paused.

6. The method of claim 5, further comprising:
  receiving, by the computerized system for generating supplemental content, input indicative of an answer to the selected question presented on the presentation device while the presentation of the program content stream is paused;
  determining, by the computerized system for generating supplemental content, a response to the answer;
  communicating, by the computerized system for generating supplemental content, a response to the answer; and
  resuming, by the computerized system for generating supplemental content, the presentation of the program content stream.

7. The method of claim 6 wherein the resuming the presentation of the program content stream is in response to the communicating the response to the answer.

8. The method of claim 6 wherein the program content stream has children's educational content.

9. The method of claim 6 wherein the presentation device is a television and the input indicative of the answer to the question is received from a mobile device of a user.

10. The method of claim 6 wherein the presentation device is a television and the input indicative of the answer to the question is received from a remote control device of a receiving device that is receiving the program content stream.

11. The method of claim 6 wherein the input indicative of the answer to the question is voice input representative of the answer to the question.

12. The method of claim 11 wherein the voice input originates from a mobile device of a user or from a voice-enabled remote control device of a receiving device that is receiving the program content stream.

13. The method of claim 6, wherein the determining, by the computerized system for generating supplemental content, a response to the answer includes:
   comparing the input indicative of the answer to the selected question to an educational concept associated with the selected question presented on the presentation device while the presentation of the program content stream is paused;
   determining whether the answer to the selected question is correct based on the comparison while the presentation of the program content stream is paused; and
   determining the response to the answer based on the determination of whether the answer to the selected question is correct while the presentation of the program content stream is paused.

14. The method of claim 13, wherein the resuming the presentation of the program content stream is in response to determining that the answer to the selected question is correct.

15. The method of claim 1 further comprising:
   receiving, by a computerized system for generating supplemental content, input indicative of a selection of one or more of: an age level of a user that is to view the supplemental content; a number of questions comprising the supplemental content for a particular program of the program content stream; and a frequency of presentation of items comprising the supplemental content; and
   causing, by the computerized system for generating supplemental content, the supplemental content to be presented as the program content stream is being output for presentation on the presentation device based on the input indicative of the selection of one or more of: an age level of a user that is to view the supplemental content; a number of questions comprising the supplemental content for a particular program of the program content stream; and a frequency of presentation of items comprising the supplemental content.

16. A system for generating supplemental content for a program content stream, comprising:
   at least one computer processor; and
   at least one memory coupled to the at least one computer processor, the at least one memory having computer-executable instructions stored thereon that, when executed by the at least one computer processor, cause the at least one computer processor to:
      generate questions, while a program content stream is being output for presentation on a presentation device, having answers that are one or more of extracted concepts communicated by verbal content of the program content stream;
      cause the questions to be presented on the presentation device or a mobile device of a user at different times while the presentation of the program content stream is paused;
      store the generated questions, as metadata associated with a program of the program content stream, for presentation as supplemental content of the program during subsequent playback of the program; and
      pause the presentation of the program content stream on the presentation device at various different times during the presentation of the program content stream;
      causing a different question of the generated questions to be presented on the presentation device or on a mobile device of a user, at each of the various different times the presentation of the program content stream is paused on the presentation device,
      resume the presentation of the program content stream on the presentation device after each of the various different times the presentation of the program content stream is paused in response to receiving a correct answer to a question presented on the presentation device or on a mobile device of the user at each of the various different times the presentation of the program content stream is paused on the presentation device; and
      control an amount of viewing time allowed on one or more of: the presentation device and one or more mobile devices of the user, based on a number of received correct answers to the different questions presented on the presentation device or on a mobile device of the user at each of the various different times the presentation of the program content stream is paused on the presentation device.

17. The system of claim 16 wherein the computer-executable instructions, when executed by the at least one computer processor, further cause the at least one computer processor to:
   cause the stored questions to be presented as supplemental content of the program during subsequent playback of the program.

18. A non-transitory computer-readable storage medium having computer-executable instructions stored thereon that, when executed by at least one processor, cause the at least one processor to:
   perform natural language processing of content of a program content stream as the as the program content stream is being output for presentation on a presentation device;
   extract concepts communicated by verbal content of the program content stream based on the performing of the natural language processing of the verbal content;
   cause questions based on the extracted concepts to be presented on the presentation device or a mobile device of a user at different times while the presentation of the program content stream is paused;
   pause the presentation of the program content stream on the presentation device at various different times during the presentation of the program content stream;
   causing a different question of the generated questions to be presented on the presentation device or on a mobile device of a user, at each of the various different times the presentation of the program content stream is paused on the presentation device,
   resume the presentation of the program content stream on the presentation device after each of the various different times the presentation of the program content stream is paused in response to receiving a correct answer to a question presented on the presentation device or on a mobile device of the user at each of the various different times the presentation of the program content stream is paused on the presentation device; and control an amount of viewing time allowed on one or more of: the presentation device and one or more mobile devices of the user, based on a number of received correct answers to the different questions presented on the presentation device or on a mobile device of the user at each of the various different times the presentation of the program content stream is paused on the presentation device.

19. The non-transitory computer-readable storage medium of claim 18 wherein the computer-executable instructions, when executed by the at least one processor, further cause the at least one processor to:
cause the presentation of the program content stream to be resumed in response to receiving a correct answer to one or more of the questions,
supplemental content to be presented as the program content stream is being output for presentation on the presentation device includes:
pausing the presentation of the program content stream on the presentation device; and
in response to the pausing the presentation of the program content stream on the presentation device, causing the supplemental content to be presented on the presentation device.

20. The non-transitory computer-readable storage medium of claim 18 wherein the causing the supplemental content to be presented as the program content stream is being output for presentation on the presentation device includes:
pausing the presentation of the program content stream on the presentation device; and
in response to the pausing the presentation of the program content stream on the presentation device, causing the supplemental content to be presented on the presentation device.

21. The non-transitory computer-readable storage medium of claim 18 wherein the causing the supplemental content to be presented as the program content stream is being output for presentation on a presentation device includes:
pausing the presentation of the program content stream on the presentation device; and
in response to the pausing the presentation of the program content stream on the presentation device, causing the supplemental content to be presented on a device of a user other than the presentation device.

22. The non-transitory computer-readable storage medium of claim 18 wherein the causing the supplemental content to be presented as the program content stream is being output for presentation on the presentation device includes:
selecting one or more of the generated questions to be presented while the presentation of the program content stream is paused;
pausing the presentation of the program content stream on the presentation device; and
in response to the pausing the presentation of the program content stream on the presentation device:
causing a video portion of the program content stream to be presented that is relevant to the selected question; and
causing the selected question to be presented on the presentation device while the presentation of the program content stream is paused.

* * * * *